United States Patent
Eppler et al.

(10) Patent No.: US 10,197,115 B2
(45) Date of Patent: Feb. 5, 2019

(54) METHOD FOR PARAMETERIZING A SOFTWARE DAMPER FOR DAMPING CHATTER VIBRATIONS

(71) Applicant: Schaeffler Technologies AG & Co. KG, Herzogenaurach (DE)

(72) Inventors: Florian Eppler, Karlsruhe (DE); Ulrich Neuberth, Otigheim (DE); Daniel Muller, Oberkirch (DE); Alejandro Munoz Casas, Karlsruhe (DE); Michael Reuschel, Ottersweier (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 201 days.

(21) Appl. No.: 15/304,327

(22) PCT Filed: Mar. 26, 2015

(86) PCT No.: PCT/DE2015/200194
§ 371 (c)(1),
(2) Date: Oct. 14, 2016

(87) PCT Pub. No.: WO2015/158341
PCT Pub. Date: Oct. 22, 2015

(65) Prior Publication Data
US 2017/0045102 A1    Feb. 16, 2017

(30) Foreign Application Priority Data

Apr. 16, 2014   (DE) .................. 10 2014 207 310
Apr. 16, 2014   (DE) .................. 10 2014 207 354
(Continued)

(51) Int. Cl.
*F16D 48/06*     (2006.01)

(52) U.S. Cl.
CPC ........ *F16D 48/06* (2013.01); *F16D 2500/102* (2013.01); *F16D 2500/1045* (2013.01);
(Continued)

(58) Field of Classification Search
CPC ... F16D 2500/1045; F16D 2500/10412; F16D 2500/304; F16D 2500/30426;
(Continued)

(56) References Cited

U.S. PATENT DOCUMENTS 5,439,428 A   *   8/1995   Slicker .................. F16D 48/06
                                                                         192/103 R
7,031,949 B2     4/2006   Lund
(Continued)

FOREIGN PATENT DOCUMENTS

DE           69919527       2/2005
DE         102010042625       4/2012
(Continued)

*Primary Examiner* — Huan Le
(74) *Attorney, Agent, or Firm* — Volpe and Koenig, P.C.

(57) ABSTRACT

A method for parameterizing a software damper is disclosed. A target clutch torque affected in specified operating states by chatter vibrations is corrected by a software damper, wherein a transfer behavior of a clutch torque transferred via a friction clutch based on the target clutch torque is ascertained during a modulation of the target clutch torque. The software damper is parameterized with the help of the ascertained transfer behavior. To parameterize the software damper quickly and comprehensively, the target clutch torque is modulated by a broadband excitation in a frequency range of the chatter vibrations, and the transfer behavior is ascertained depending on operating parameters of the drivetrain.

9 Claims, 2 Drawing Sheets

(30) Foreign Application Priority Data

| Apr. 16, 2014 | (DE) | 10 2014 207 361 |
|---|---|---|
| Apr. 25, 2014 | (DE) | 10 2014 207 833 |
| Jul. 15, 2014 | (DE) | 10 2014 213 703 |
| Jul. 17, 2014 | (DE) | 10 2014 213 925 |
| Jul. 17, 2014 | (DE) | 10 2014 213 927 |
| Jul. 22, 2014 | (DE) | 10 2014 214 196 |

(52) U.S. Cl.
CPC ............. *F16D 2500/10412* (2013.01); *F16D 2500/304* (2013.01); *F16D 2500/306* (2013.01); *F16D 2500/308* (2013.01); *F16D 2500/3042* (2013.01); *F16D 2500/30426* (2013.01); *F16D 2500/30806* (2013.01); *F16D 2500/30816* (2013.01); *F16D 2500/3107* (2013.01); *F16D 2500/3125* (2013.01); *F16D 2500/3127* (2013.01); *F16D 2500/3163* (2013.01); *F16D 2500/3168* (2013.01); *F16D 2500/50287* (2013.01); *F16D 2500/50293* (2013.01); *F16D 2500/708* (2013.01); *F16D 2500/7044* (2013.01); *F16D 2500/7061* (2013.01); *F16D 2500/7082* (2013.01); *F16D 2500/70605* (2013.01); *F16D 2500/70668* (2013.01); *F16D 2500/70673* (2013.01); *F16D 2500/7109* (2013.01)

(58) Field of Classification Search
CPC . F16D 2500/30806; F16D 2500/30816; F16D 2500/3163; F16D 2500/3168; F16D 2500/50287; F16D 2500/50293; F16D 2500/70605; F16D 2500/7061; F16D 2500/70668; F16D 2500/70673; F16D 2500/708; F16D 2500/7082; F16D 2500/7109; F16D 48/06

See application file for complete search history.

(56) References Cited

U.S. PATENT DOCUMENTS

| 2004/0210374 | A1 | 10/2004 | Werner et al. | |
|---|---|---|---|---|
| 2005/0197234 | A1* | 9/2005 | Reuschel | F16H 61/04 477/41 |
| 2009/0000901 | A1 | 1/2009 | Reibold | |
| 2009/0186743 | A1 | 7/2009 | Fodor et al. | |
| 2010/0185373 | A1* | 7/2010 | Herter et al. | B60W 30/20 701/67 |
| 2012/0083953 | A1* | 4/2012 | Izawa et al. | B60W 20/40 701/22 |
| 2014/0207349 | A1 | 7/2014 | Christ et al. | |
| 2015/0060230 | A1 | 3/2015 | Neuberth et al. | |

FOREIGN PATENT DOCUMENTS

| DE | 102011084844 | 4/2013 |
|---|---|---|
| DE | 102013204698 | 10/2013 |
| EP | 2009313 | 12/2008 |
| WO | 03019029 | 3/2003 |

* cited by examiner

METHOD FOR PARAMETERIZING A SOFTWARE DAMPER FOR DAMPING CHATTER VIBRATIONS

BACKGROUND

The invention relates to a method for parameterizing a software damper connected to a clutch control system for damping chatter vibrations of a clutch torque being transferred by means of an automated friction clutch which is controlled by the clutch control system by means of a target clutch torque and which is positioned between a combustion engine and a drivetrain of a motor vehicle, wherein the target clutch torque affected in specified operating states by chatter vibrations is corrected by means of the software damper, wherein a transfer behavior of a clutch torque transferred via the friction clutch on the basis of the target clutch torque is ascertained during a modulation of the target clutch torque and the software damper is parameterized with the help of the ascertained transfer behavior.

Automated friction clutches, for example friction clutches combined into a dual clutch, are sufficiently well known and are inserted into drivetrains having a combustion engine and a transmission, for example an automated shift transmission, dual-clutch transmission or the like, between the combustion engine and the transmission. The friction clutch is operated in such cases by means of a clutch positioner as well as a clutch actuator. The clutch actuator is controlled by a clutch control system. The clutch control system contains a regulator that operates the friction clutch on the basis of a target clutch torque which can be obtained by means of a driving strategy program for example depending on a driver's desired torque, driving situations, road conditions and the like, in such a way that a specified clutch torque is present at its output.

Because of the properties of the friction clutch, the transmission and the like, chatter processes may occur at the friction clutch which result in a vibration-accompanied transfer of the target clutch torque with a fixed frequency response in a frequency range up to 30 Hz for example.

In order to attenuate this frequency response, a method for reducing chatter vibrations is known from DE 10 2013 204 698 A1, in which an emulated vibration absorber, i.e., a software-based vibration absorber, is superimposed on the clutch positioner for the target clutch torque as a software damper.

Knowledge of the drivetrain behavior and of the transfer behavior on the basis of the target clutch torque is necessary for system identification and design. In order to ascertain this transfer behavior, chatter vibrations are simulated by modulating the target clutch torque and drawing upon the resulting signals which are relevant for driving comfort, for example the longitudinal acceleration of the motor vehicle or the transmission input speed, to design and parameterize the software damper, for example a regulator or filter.

This purpose is served by modulations of the target clutch torque in the relevant frequency range of chatter vibrations, typically between 2 Hz and 30 Hz. Here, a frequency response of the system is determined, for example over a control link beginning with the clutch control system, through the clutch positioner, through the friction clutch subject to chatter vibrations to its output, for example a transmission input shaft vibrationally coupled, by carrying out for time periods of typically a few seconds a sinusoidal excitation having a fixed frequency in the desired operating state on the clutch torque for example with a step width of 0.5 Hz across the relevant frequency range of the chatter vibrations in relevant operating states, for example moving off and creeping situations and when engaging the clutch after gear changes. The evaluation of the transfer behavior is carried out largely by hand, by relating the amplitudes of modulation torque and transmission input speed or longitudinal acceleration to each other in a component-by-component examination of the frequency components according to a discrete Fourier transformation. This yields a transfer function which is used for parameterizing the software damper. This method is very time-intensive.

SUMMARY

The object of the invention is to advantageously refine a method for designing and parameterizing a software damper.

The object is fulfilled by the features of the invention. Advantageous embodiments of the method are described below.

The proposed method serves to parameterize a software damper connected to a clutch control system, which is intended for damping chatter vibrations of a clutch torque. The clutch torque is transferred through a friction clutch positioned between a combustion engine and a transmission in a drivetrain of a motor vehicle, depending on a target clutch torque specified from a driving strategy. The friction clutch is controlled by a clutch positioner by means of a position controller, whose input signal is, among other things, the target clutch torque and whose output signal is an actuation travel or the like. Superimposed on the position controller is the software damper, which corrects chatter vibrations that occur in specified operating states by correcting the loaded target clutch torque. To parameterize the software controller, a transfer behavior of the clutch torque across the system, in particular the friction clutch, is obtained, in which the target clutch torque is modulated by means of vibrations in the range of chatter vibration frequencies that are expected, modeled or obtained empirically on the motor vehicle. On the basis of the ascertained transfer behavior, the software damper is then identified and parameterized. In order to achieve a quick and comprehensive parameterization, the target clutch torque is modulated by means of a broadband excitation in a frequency range of the chatter vibrations, and the transfer behavior is ascertained depending on operating parameters of the drivetrain.

The proposed method for exciting the control link, for example the drivetrain, provides for the use of a broadband signal instead of the previously used fixed-frequency sine functions to modulate the target clutch torque, which is modulated in the relevant operating state of the chatter vibrations to the clutch torque which results from the driving strategy.

The spectrum relevant for the system identification is covered over the entire determination of the transfer behavior by this continuous broadband excitation. In this way, a greatly improved frequency resolution in the transfer function is achieved in a significantly shortened testing time. At the same time, in a preferred manner, a maximum amplitude of the target clutch torque is held to a specified fixed value.

Various advantageous methods may be provided for implementing a broadband excitation of the system of this sort. In a first form of the excitation, a pseudorandom binary sequence (PRBS) can be modulated up to the target clutch torque. PRBS is understood to mean a binary signal which shares the spectrum of white noise. The PRBS consists essentially of two signal levels, between which the system switches, for example, in a 20 ms rhythm. This switching between the levels results in a rectangular modulation, which is distinguished in the spectrum by an amplitude dependency of the form $$\frac{\sin\left(\frac{\pi}{50 \text{ Hz}} \cdot v\right)}{v}$$

with the frequency v. However, because of the rapid switchover time of 20 ms this dependency becomes noticeable only at frequencies starting around 50 Hz, since the first frequency components disappear here. The spectrum of the PRBS signal described here is present at any time. As a result, the required duration of the experiment is determined only by the frequency resolution desired in the transfer function. This applies, according to the interconnections of the discrete Fourier transformation, for the entire duration $T_{Ex}=1/\Delta v$ of the determination of the transfer behavior, where $\Delta v$ is the desired frequency resolution. Additional measuring time increases the signal-to-noise ratio.

A preferred embodiment of a broadband excitation may be designed in the form of a sinusoidal signal with time-relevant frequency, for example in the form of a so-called sine sweep. In this case, the frequency is changed continuously in the frequency band desired for the transfer behavior. This continuous modification makes it possible to cover the complete frequency band within a relatively short period of time.

In addition, preferred embodiments of a broadband excitation may be provided, for example, by means of adaptive filtering, for example by means of transverse filtering using an LMS algorithm (least mean squares algorithm). Excitation sources for determining the transfer behavior may be in particular pulse responses of the clutch torque or of the target clutch torque to stored pulses obtained during driving operation of a motor vehicle.

The transfer behavior of the drivetrain is of central importance for successful anti-chatter control. By ascertaining the transfer function or transfer behavior with sufficient precision, the software damper, for example in the form of a regulator or filter, can be parameterized with such stability and robustness that additional excitations are unlikely.

To achieve an adaptation of the software damper to a transfer behavior of the drivetrain which changes depending on operating states of the motor vehicle, depending on the existing target clutch torque, to the transmission input speed or the vehicle acceleration, it is proposed if possible that all operating states that change the transfer behavior be incorporated into this determination.

For the most comprehensive possible determination of the transfer behavior and the associated parameterization of the software damper, the transfer behavior can therefore be determined depending on operating states and parameters of the control link, of the drivetrain, and ultimately of the entire motor vehicle and its components which are joined in a vibratory interconnection. In a preferred form, the transfer behavior can be ascertained, in a non-final enumeration, depending on a mean torque transmitted via the friction clutch, a selected gear of the transmission, masses of the drivetrain that are coupled with each other, for example auxiliary units of the combustion engine that can be connected and disconnected, a hybrid module and the like, on masses that are coupled vibrationally with the drivetrain, for example the vehicle body with a vehicle mass, a trailer of the motor vehicle and the like, on at least one temperature of a component of the drivetrain, for example the temperature of the clutch positioner, the friction clutch, the combustion engine and/or the transmission or the like, on a driving resistance of the motor vehicle, for example the tire properties, the tire pressure or the like.

The target clutch torque specified by the driving strategy acts here as a pre-load, which corresponds to a pre-stressing of the drivetrain. This overcomes any free play and places elastic elements in the drivetrain under stress—this influences the transfer behavior of the drivetrain significantly. As a result, the transfer behavior is determined depending on the transferred clutch torque, for example at different pre-loads—i.e., at different operating points of the friction clutch.

Since the drivetrain has a transmission ratio that depends on the gear, the coupling of the masses contained in the drivetrain differs with different choices of gears and their transmission ratios. Furthermore, in the case of a dual-clutch transmission, the aggregate of the coupled vibratory masses changes when a gear is engaged or disengaged on the inactive shaft. This likewise influences the transmission behavior of the drivetrain, in that activating a gear lowers the resonant frequency, while disengaging an additional gear raises the frequency, so that the transfer behavior is determined depending on this.

Since the vehicle in its entirety is part of a vibratory system, its mass influences the transfer behavior. This must be taken into account in the event of a corresponding change in the total mass. Recognition of a change of the vehicle mass may be part of an integrated regulator concept, for example in that the vehicle mass is taken into account in the transfer behavior by means of a drivetrain observer from a clutch torque model. The recognition can take place through evaluation of a combination of signals and an observer structure. Relevant measurement signals include, for example, engine torque, engine speed, transmission speed, acceleration of the motor vehicle and also additional information sources, for example seat occupancy detection and/or the like.

The slope which the motor vehicle has to overcome during the process of moving off plays an important role with regard to the transfer behavior, since, for example, the combustion engine braces against its bearings in a different manner than is the case on the flat. This changes the vibration modes of the engine mass, and the transfer behavior of the drivetrain changes. Like the changed vehicle mass, this can be detected on the basis of the acceleration of the motor vehicle, for example by means of an acceleration sensor, and may be included in determining the transfer behavior.

Since the entire system of the motor vehicle is affected by chatter vibrations, the tires mounted on the motor vehicle also influence these vibrations and thus also the transfer behavior. At the same time, the changed rolling resistance plays a central role. The rolling resistance, for example, and/or similar parameters, are therefore taken into account when determining the transfer behavior. The tire pressure is often known in modern vehicles through corresponding sensors in the tires, and can therefore be available for the transfer function.

Besides the change due to the vibratory total mass—the influence here should be analogous to that of the changed vehicle mass—the use of a trailer makes an additional source for changes to the vibratory system. This results from the fact that when the body of the vehicle vibrates, the trailed mass may also vibrate for example contrary to the vehicle, and may thereby fundamentally change the resonance behavior, so that operation with a trailer is advantageously accounted for accordingly when determining the transfer behavior.

If a possibly available four-wheel drive is engaged, the masses coupled in the system change and thus also the vibration and transfer behavior. Furthermore, it can be assumed that the rigidities contained in the system are intensified. This can be taken into account in the case in question in determining the transfer behavior.

In the case of an activatable hybrid module, the sum of the coupled masses changes when it is activated. In addition, the electric motor may provide for additional damping in the system, or may even influence the system behavior actively through its actuation. These factors influence the transfer function of the drivetrain, and are taken into account in the link identification and the parameterization.

The temperatures in the positioning and transfer elements influence the vibration behavior, because friction/damping change accordingly. For example, known temperatures of the actuator, the friction clutch, the environment and/or the like may be registered and included in determining the transfer behavior.

Through activatable units which may possibly be used in the motor vehicle, such as an air conditioner, recovery module and the like, additional masses may be coupled to the drivetrain, and under certain circumstances additional damping elements may be linked in. In this case, this results in changed dynamics of the drivetrain which is taken into account beneficially with regard to determining the transfer behavior.

Going beyond system identification and determining the transfer behavior, during operation the activation and deactivation of the anti-chatter control system may be controlled meaningfully. To this end, controllable and non-controllable driving situations are identified and determined. The definition of a non-controllable driving situation occurs when designing the software damper in conjunction with a system identification. These driving situations can be recognized while driving, so that a corresponding deactivation of the software damper can be carried out. At the same time, possible occurrence of a deterioration of driving comfort—for example through abrupt on-and-off switching of the software damper—will be prevented, for example, by a continuous transition between on and off states of the regulator, which is achieved through a continuous increasing and reducing of the total intensification factor. This transition is initiated upon reaching a non-controllable state, and likewise upon reaching a controllable state again.

Furthermore, unwanted effects that can result in a possible recoupling with the resonant frequency of the system may be attenuated, so that they are not recognized by the software damper. This comes about, on the one hand, through firm shut-off conditions and, on the other hand, through suitable time filtering of the input signals of the software damper. The shut-off conditions relate here to a minimum rotational speed below which the control system is deactivated, since in this range, due to technical reasons of the speed measurement, the signal quality decreases severely and reliable regulation can no longer be guaranteed. In addition, a certain minimum slip speed is preferably set at the friction contact of the friction clutch, so that sticking of the friction clutch and thus unwanted additional excitations of the natural frequency of the drive train are avoided. Since, if chattering occurs, the proposed shutoff conditions are exceeded and again under-run by the chatter frequency, the regulator would accordingly be switched on and off with the chatter frequency. This would introduce an additional excitation of this frequency, and that would further destabilize the system. The shut-off process therefore takes place instantaneously, while switching the regulator on again is temporally debounced. In doing so, the shut-off condition must be violated continuously again for a certain period of time, so that the overall intensification factor is elevated again. This prevents a continuous switching on and off of the regulator.

Furthermore, the regulator may be shut off or attenuated for reasons of stability, if the clutch characteristic on which the driving state is based has too high a slope. This too-steep course could make the resolution of the clutch actuation too coarse for an appropriate modulation torque, which would make an overdriving of the software damper possible, and thus a negative influence on the stability of the system. Therefore no regulation takes place in this case.

Analogously or in addition thereto, in addition the entire modulation torque introduced by the software damper may be limited by an internal characteristic, so that possible identified excessive and thus no longer controllable modulation torques cannot be introduced into the target clutch torque to their full extent.

Another stability-relevant action may be reinstallation of the software damper. In order to avoid any errors in the phase position of the active regulating signal with regard to the chatter vibration to be regulated, the regulator is reinstalled when the active friction clutch of a dual-clutch transmission is replaced. This makes it possible to detect and compensate appropriately for changes in the chatter characteristics which are to be expected due to the clutch replacement, independent of the previous behavior.

Furthermore, for stable regulation of the software damper, the running time of the regulating algorithm as part of the vehicle software in the control device of the vehicle may be minimized. The faster the anti-chatter component runs in the control device, the faster it can respond to changes in the system and its behavior. Furthermore, it must be guaranteed that the memory requirement of the regulator component is kept as small as possible. This, and the two different timings often used in the control device, result in the necessity of conceiving the software damper in such a way that time-critical parts of the regulating algorithm are executed at the faster of the two available speeds, so that the fastest possible response to changes in the input values is guaranteed. The less time-critical parts of the software damper, on the other hand, are executed at the slower speed, in order to save both memory and processor resources and to optimize the total running time of the regulator.

BRIEF DESCRIPTION OF THE DRAWINGS

The invention will be explained in further detail on the basis of the exemplary embodiment depicted in FIGS. 1 through 4. The figures show the following.

DETAILED DESCRIPTION OF THE PREFERRED EMBODIMENTS

Figure 1:
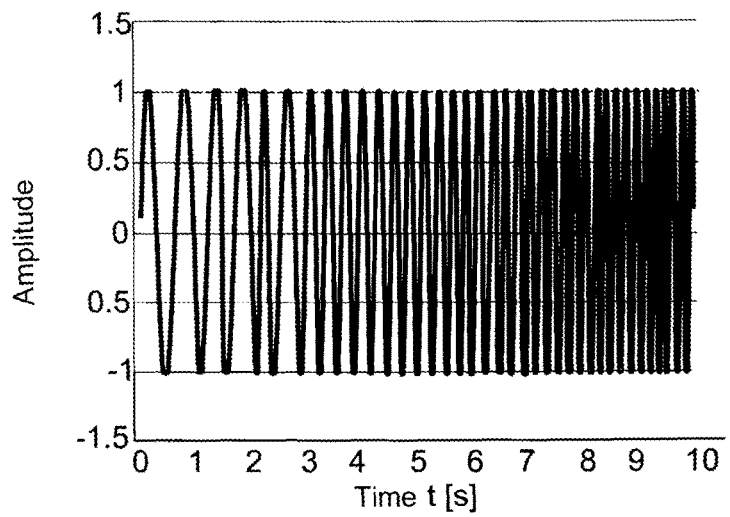
FIG. 1 a time sequence of a sine sweep.

The sine sweep shown in FIG. 1 is created by means of a signal generator. A sinusoidal signal with a specified frequency and torque amplitude is produced. In the exemplary embodiment shown, the frequency is increased in a fixed interval, which results in a stepped frequency pattern. The frequency range used typically lies between 1.5 Hz and 30 Hz, which yields the modulated signal shown. This procedure yields a very broadband spectrum, which makes it possible to obtain the most detailed possible frequency response of the system over the control link.

Figure 2:
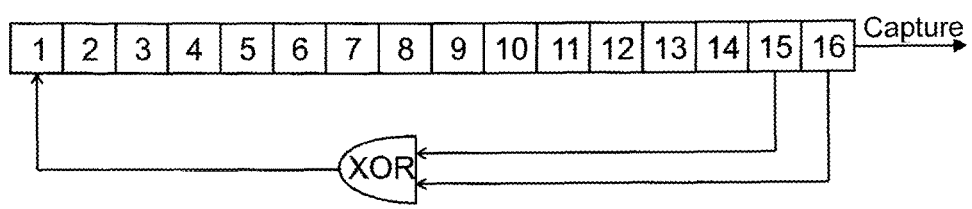
FIG. 2 a diagram to depict a broadband excitation of the target clutch torque by means of a linear feedback shift register to generate a PRBS signal, FIG. 3 a diagram with the time sequence of a PRBS signal that modulates the clutch torque, and FIG. 4 a diagram with the spectrum of a PRBS signal.
Figure 3:
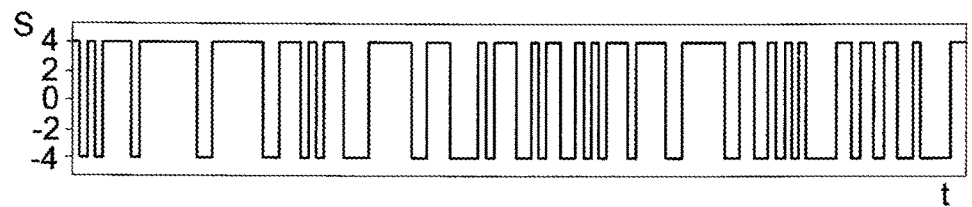
Figure 4:
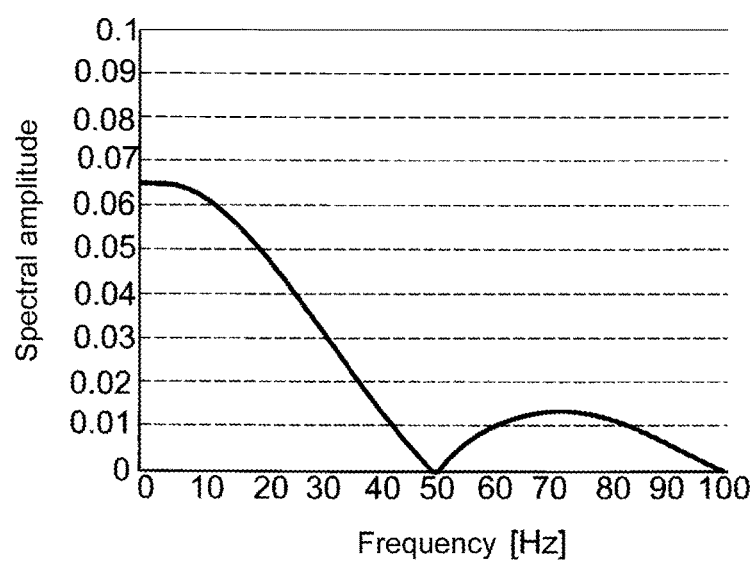

FIGS. 2 through 4 show an alternative method to the method in FIG. 1, in order to achieve a broadband excitation of the target clutch torque. This method is based on the excitation using a pseudorandom binary sequence (PRBS) signal. To this end, a so-called linear feedback shift register (LFSR) is implemented, which outputs zero or one quasi at random after every call. This generates a randomly varying signal level with a given amplitude. The linear feedback shift register shown in FIG. 2 is realized by a binary-interpreted number of desired magnitude. The following values are generated by first capturing certain places in the number dependent on the length of the register, and joining them into a new bit by means of appropriate logical links. This new bit is then inserted at the beginning of the register, and the rest of the bits are each displaced by one position. A random level is realized by the capture of the last bit. In FIG. 3, the random level S is added to the target clutch torque from a driving strategy to set a static clutch torque at the friction clutch. By means of this modulation, an excitation of the drivetrain is achieved with a broadband modulation of the clutch torque. The level S depicted in FIG. 3 represents a rectangular modulation, which is distinguished in the spectrum by an amplitude dependency of the form $$\frac{\sin\left(\frac{\pi}{50\text{ Hz}} \cdot v\right)}{v}.$$

The switchover time of 20 ms causes the amplitude dependency to become noticeable only at frequencies starting around 50 Hz, since the first frequency components disappear here.

FIG. 4 shows the spectrum of the PRBS signal for this. This is present at any time. As a result, the required duration of an experiment to ascertain the transfer behavior of the modulated target clutch torque is determined essentially by the frequency resolution desired in the transfer function and the desired signal-to-noise ratio. This applies, according to the interconnections of the discrete Fourier transformation, for the minimum entire duration $T_{Ex}=1/\Delta v$ of the experiment, where $\Delta v$ is the desired frequency resolution. For a typical measurement of adequate quality for designing and parameterizing the software damper, a measurement period of typically at least 30 s is used.

The invention claimed is:

1. A method for parameterizing a software damper connected to a clutch control system for damping chatter vibrations of a clutch torque being transferred by an automated friction clutch which is controlled by the clutch control system by a target clutch torque and which is positioned between a combustion engine and a drivetrain of a motor vehicle, comprising correcting the target clutch torque affected in specified operating states by chatter vibrations by the software damper, including ascertaining a transfer behavior of the clutch torque transferred via the friction clutch on the basis of the target clutch torque during a modulation of the target clutch torque, parameterizing the software damper with the ascertained transfer behavior, modulating the target clutch torque by a broadband excitation in a frequency range of the chatter vibrations, and ascertaining the transfer behavior depending on operating parameters of the drivetrain.

2. The method according to claim 1, further comprising generating the broadband excitation by a PRBS signal.

3. The method according to claim 1, further comprising generating the broadband excitation by a sinusoidal signal with time-variable frequency.

4. The method according to claim 1, further comprising ascertaining the transfer behavior depending on a mean clutch torque.

5. The method according to claim 1, further comprising ascertaining the transfer behavior depending on a selected gear of the transmission.

6. The method according to claim 1, further comprising ascertaining the transfer behavior depending on masses of the drivetrain which are coupled with each other.

7. The method according to claim 1, further comprising ascertaining the transfer behavior depending on masses of the drivetrain which are coupled vibrationally with the drivetrain.

8. The method according to claim 1, further comprising ascertaining the transfer behavior depending on at least one temperature of a component of the drivetrain.

9. The method according to claim 1, further comprising ascertaining the transfer behavior depending on a driving resistance of the motor vehicle.

* * * * *